June 15, 1971 H. S. SINGER ET AL 3,585,050

COOKING ENSEMBLE AND COVER THEREFOR

Filed Nov. 15, 1968

INVENTORS
HANS S. SINGER
WALTER K. CHLYSTUN
BY
ATTORNEY

United States Patent Office 3,585,050
Patented June 15, 1971

3,585,050
COOKING ENSEMBLE AND COVER THEREFOR
Hans S. Singer and Walter K. Chlystun, Spartanburg, S.C., assignors to Mahasi Corporation, Spartanburg, S.C.
Filed Nov. 15, 1968, Ser. No. 776,163
Int. Cl. A47j 37/12
U.S. Cl. 99—357                                    10 Claims

ABSTRACT OF THE DISCLOSURE

An improved cooking ensemble comprising the combination of a cooking vessel; a cover for the cooking vessel having a splash guard, utensil holding means for positioning the utensil and an edible during cooking and means for holding utensils around the periphery of the cover when the utensil is not in use; a support to hold the cooking vessel and suitable heat source and a cluster of removable dishes. An improved cover for a cooking vessel having splash guards to prevent cooking medium from splashing out of the vessel, channels to hold utensils with an edible attached thereto and means around the periphery of the cover to hold utensils not in use.

BACKGROUND OF THE INVENTION

The culinary arts have progressed in phase with certain sociological developments of society. Individuals constantly seek to streamline their day to day operations; to make them more convenient whereby they enjoy more leisure time. The housewife, for instance, continually seeks to improve her modus operandi such that she has more time to devote to her children, hobbies or general relaxation. Also the general public of today continually search for a unique experience.

The present invention categorically provides at least partial fulfillment of the aforementioned desires. The cooking cover and ensemble of the present invention provide casual entertainment at its finest. A family can enjoy a delectable meal from the present invention with little effort or preparation required. Children enjoy very much using the cooking ensemble for meals or snacks. All in all the cooking cover and ensemble of the present invention provide heretofore unheard of opportunities for appreciation of the culinary arts by anyone from a child to an accomplished gourmet.

The art pertinent to the present invention has advanced from the common fondue pot to a fondue pot having a cover with splash guards as may be seen in U.S. 3,038,402 to Singer. Teachings of the present invention however extend beyond the prior art as may readily be seen from the following description.

SUMMARY OF THE INVENTION

Generally, the present invention teaches an improved cover for a cooking vessel having incorporated therein splash guards to prevent cooking medium from splashing onto the table or user, channels for holding a utensil having an edible thereon in a proper position for cooking and means for holding utensils around its periphery when the utensils are not in use. The cover of the present invention is further provided with a flange depending downwardly from its underside to telescope into and mate with the inside walls of a cooking vessel which affords stability to the cooking vessel and cover combination. The present invention further teaches a cooking ensemble comprising a support, a cooking vessel resting thereon, a cover for said cooking vessel having splash guards and utensil holding channels therein and having means around its periphery for holding utensils when the utensils are not in use, heating means disposed beneath said vessel and removably mounted on said support and a plurality of edible or food containers removably mounted around the base of said support.

DESCRIPTION OF DRAWINGS

The invention will be more readily understood from a reading of the following specification with reference to the accompanying drawing forming a part thereof, wherein an example of the invention is shown and, wherein.

DESCRIPTION OF THE INVENTION

Figure 1:
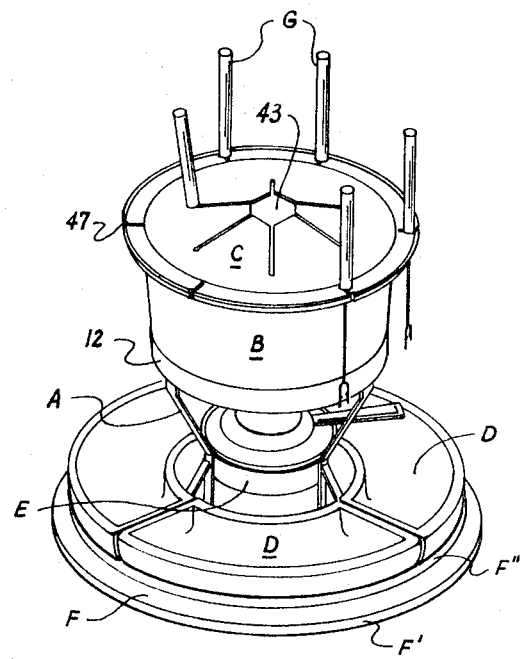
FIG. 1 is a perspective view of a cooking ensemble according to the teachings of the present invention.
Figure 2:
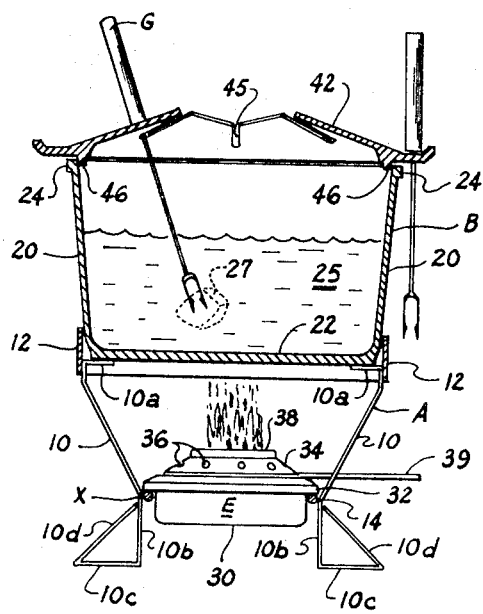
FIG. 2 is an enlarged sectional view of a portion of the ensamble shown in FIG. 1.

Referring more particularly to the drawings, FIGS. 1 and 2 show the cooking ensemble having a support A, cooking vessel B, cover C, removable edible or food container D and cooking means E. Support A is constructed of a series of legs 10 that are united by a band 12 at their upper ends and a ring member 14 at their lower ends. Each leg 10 has at its upper end, a horizontal extension 10a that, in conjunction with band 12, provides a seat for cooking vessel B. Legs 10 extend downwardly and inwardly from band 12 to point X where they are secured by ring 14. Below point X legs 10 further extend downwardly to form a base pod indicated by members 10b, 10c and 10d.

The cooking vessel indicated generally as B is preferably circular and as such is comprised of circular side walls 20 and flat bottom 22. At the top of side walls 20 is bead 24 which engages cover C to form a partial seal around the open end of vessel B. Vessel B can, however, be any type of open vessel that is capable of holding a medium into which an edible may be placed for cooking.

The cooking vessel and cover of the present invention may be constructed of any suitable material. For instance, cast iron, copper, stainless steel, silver and the like are quite suitable materials of construction for either the vessel or the cover. Some users of the cooking ensemble will desire to prepare fondue using a meat of some type and others will prefer a cheese fondue where small chunks of bread are dipped into a cheese preparation in the vessel and then consumed. Particular ingredients in the cheese preparation will attack normal metals with the exception of stainless steel. Accordingly, to render the cooking vessel sufficiently versatile to accommodate both beef and cheese type fondues, the cooking vessel may be lined with a suitable material that is unaffected by the cooking medium for a meat or the cheese preparation that is heated in the vessel. A very suitable material is polytetrafluoroethylene sold by E. I. du Pont de Nemours under its registered trademark Teflon. The polytetrafluoroethylene coating not only protects the metal from attack by ingredients in the cheese fondue preparation, but also renders the vessel more easily cleanable.

Cover C for vessel B is one of the unique features of this invention and is constructed in such a manner that the cooking medium does not splash out of the cooking vessel. Utensils G with edible affixed thereon, when placed within the cooking vessel are held in an upright position for proper cooking of the edible. The utensils are maintained apart from each other and do not become entangled while in the vessel. Furthermore, the edible on one utensil is not touched by the edible on another utensil to be knocked off into the cooking medium. Also, the cooking heat is retained and does not escape as readily as it would from a normal fondue pot or the like. Moreover, utensils are held by appropriate means around the periphery of the cover. Persons utilizing the cooking ensemble of the present invention are normally seated around the ensemble. Hence proper positioning of the utensil for individual use is quite desirable. Cover C is also provided with a flange on its underside that telescopes into and mates with the inner surface of the sidewalls 20 of the cooking vessel to prevent lateral movement of the cover which could cause the vessel to overturn and also to provide a partial seal to assist in maintaining even heat within the cooking vessel.

Figure 3:
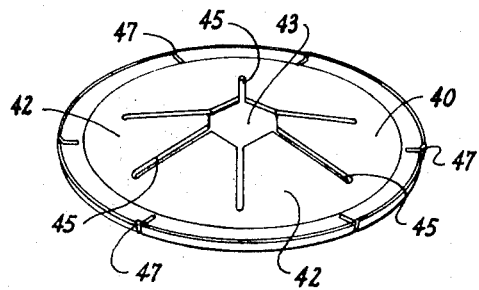
FIG. 3 is a perspective view of a cover for a cooking vessel in accordance with the teachings of the present invention.

Referring to FIG. 3, cover C may be described as an annulus 40 having splatter shields 42 extending upwardly and inwardly therefrom. All of the shields 42 terminate inside annulus 40 to define central opening 43. Each shield 42 is separate from adjacent shields and the channels 45 defined therebetween are provided to support utensil G with edible 27 thereon while the edible is cooking. When utensil G is not in use, it may be held by the cover at a slot 47 around the periphery of annulus 40. Referring now to FIG. 2, the underside of cover C is provided with a downwardly depending flange 46 extending around the annulus 40 at a point away from its outer edge. Flange 46 telescopes into and mates with the inside of bead 24 on sidewall 20 of vessel B to maintain a partial seal between the cover C and the vessel B and to prevent lateral movement of the cover with respect to the vessel that could be caused by an inadvertent blow to the cover or vessel.

While utensil holding means 47 are preferable slots in cover C, it should be understood that other utensil holding means may be employed. For instance, slots 47 could be replaced by holes of suitable size such that the forward, edible holding end of utensil G would pass through while the handle would not. Further, instead of slots 47, the outer periphery of annulus 40 could be provided with a series of U shaped members extending outwardly therefrom to hold the utensils G in much the same manner as they are supported by slots 47.

Heating means E are disposed beneath vessel B and reside within support A. Heating means E may be of any type that is capable of providing sufficient heat to vessel B to heat a cooking medium 25 to a sufficient temperature to cook an edible 27 on utensil G. For purposes of illustration a small burner 30 is shown as a heating means. Burner 30 has a shoulder 32 that seats on ring 14 of support A, and a wick (not shown) that is within an upper dome portion 34. Dome 34 is provided with series of holes 36 through which air passes to support combustion (not shown) and an upper aperture 38 through which flames pass to heat vessel B. Burner 30 is readily removable from support A by handle 39 shown secured to dome 34.

Edible containers D are positioned around the base of support A and heating means E. These containers form a part of the cooking ensemble and are provided to hold the desired foods either before or after cooking. Each dish may be arcuate in shape and may nest with or abut adjacent containers as in FIG. 1, or may assume any design or configuration desired. The entire ensemble preferably is positioned on a suitable tray or base to maintain its integrity as a single unit. Such a tray F is shown in part in FIG. 1. Tray F is flat and circular and has a raised outer rim F'. Containers D are shown circumferentially spaced around support A and rest on the flat portion of tray F while a portion of the outer surface of containers D engage the sloped inner surface F'' of the raised outer rim of tray F to prevent containers D from separating from each other and becoming apart from the cooking ensemble.

The cooking ensemble of the present invention is shown in use in FIGS. 1 and 2. Support A rests on the flat portion of tray F, being surrounded by removable containers D. Heating means E is positioned on support A at point X and cooking vessel B is positioned above seated on horizontal members 10a. Cover C is placed on vessel B wherein flange 46 telescopes into vessel B and mates with the inside of bead 24 of sidewalls 20. FIG. 2 shows a cooking fluid in vessel B in which an edible 27 is supported by a fork-type utensil G while in turn utensil G is supported by channel 45 of cover C. Utensils 29 that are not in use are shown in FIGS. 1 and 2 as being held around the periphery of cover C by slots 47. After edible 27 is cooked to the satisfaction of the consumer, utensil G is moved inwardly to central opening 43 and removed from vessel B. Edible 27 is then disengaged from utensil G and utensil G is stored on cover C at an available slot 47 until use is again desired.

The cooking medium preferably should be maintained near its boiling point so that, meat, for example, may be seared rapidly to seal in flavor and juices. Additionally, edibles include ground meat patties or balls, sausage, weiners, shrimp, crab, fish cubes, etc. Small cubes, balls or slices of bite size portions, after cooking for a short period of time, may be removed and eaten with a variety of sauces or condiments. While one portion is being eaten, another may be placed on the utensil, positioned in an available channel 47 and cooked to the satisfaction of the consumer. As set forth previously, with the proper vessel, a cheese preparation may also be heated in the cooking vessel and bread cubes dipped therein for eating. The present cooking ensemble is very versatile and quite suitable for formal entertaining, normal everyday use, children's parties, picnics, and the like.

While a preferred embodiment of the present invention has been specifically described, such description is illustrative only, and it is obvious that changes and variations may be made without departing from the scope of the appended claims.

We claim:
1. An improved cover for a cooking vessel comprising:
 (a) a plurality of spaced apart, inwardly projecting shields;
 (b) an annulus integral with said shields at their outer edges to define an opening in said cover;
 (c) said annulus extending outwardly from said shields to a point beyond each outer side wall of a cooking vessel with which the cover may be used, said annulus also having utensil holding means associated therewith to hold said utensils when the utensils are not in use, said annulus further being provided with a downwardly depending flange positioned inwardly from the outer edge thereof; and
 (d) each shield, in conjunction with each next adjacent shield defining a channel therebetween, said channel connecting with said opening and being terminated at its outer end by said annulus, said channel being capable of supporting a utensil extending through said cover with an edible attached thereto.

2. The cover as defined in claim 1 wherein the means for holding utensils when not in use are a plurality of slots in said annulus around its outer periphery.

3. The cover as defined in claim 1 wherein said utensil holding means are a series of apertures in the annulus near its outer edge.

4. The cover as defined in claim 1 wherein said utensil holding means are a plurality of slotted projections extending outwardly from said annulus.

5. A cooking ensemble comprising:
 (a) a support;
 (b) a cooking vessel removably seated on said support;
 (c) a cover for said cooking vessel, said cover having a plurality of spaced apart inwardly projecting shields, said shields being integrally connected by an annulus at their outer ends, said integrally connected shields defining an opening in the cover at their inner ends and channels therebetween that connect with said opening, said annulus having associated therewith utensil holding means for holding said utensils when the utensils are not in use, said annulus further having a downwardly depending flange on its underside positioned inwardly from the outer edge thereof;

(d) heating means positioned beneath said cooking vessel and removably seated on said support;

(e) at least one edible container disposed about said support and associated therewith.

6. The cooking ensemble of claim 5 wherein utensil holding means are a plurality of slots in said annulus around its outer periphery.

7. The cooking dish ensemble of claim 5 wherein utensil holding means are slotted projections extending outwardly from said annulus around its outer periphery.

8. The cooking dish ensemble of claim 5 wherein said utensil holding means are a plurality of apertures positioned around the annulus near its outer edge.

9. The cooking dish ensemble as defined in claim 5 having additionally a base on which the support and edible containers rest.

10. An improved cover for a cooking vessel comprising:

(a) a plurality of spaced apart, inwardly projecting shields;

(b) an annulus integral with said shields at their outer edges to define an opening in said cover;

(c) said annulus extending outwardly from said shields to a point beyond each outer side wall of a cooking vessel with which the cover may be used, said annulus turning upwardly at its outer end and having a plurality of utensil holding slots positioned around the periphery thereof, whereby curvature of the annulus assists in maintaining the utensils in the slots; and (d) each shield, in conjunction with each next adjacent shield defining a channel therebetween, said channel connecting with said opening and being terminated at its outer end by said annulus, said channel being capable of supporting a utensil extending through said cover with an edible attached thereto.

References Cited

UNITED STATES PATENTS

| 700,653 | 5/1902 | Jobson | 211—60KUX |
| 1,559,644 | 11/1925 | Relkin | 248—37.6X |
| 3,038,402 | 6/1962 | Singer | 99—419X |
| 3,042,019 | 7/1962 | Taylor | 126—43 |

FOREIGN PATENTS

| 317,833 | 1/1957 | Switzerland | 220—44A |

WALTER A. SCHEEL, Primary Examiner

L. G. MACHLIN, Assistant Examiner

U.S. Cl. X.R.

99—403, 421; 220—44